United States Patent
Takano et al.

(10) Patent No.: US 12,438,187 B2
(45) Date of Patent: *Oct. 7, 2025

(54) SOLID ELECTROLYTE AND ALL SOLID STATE BATTERY

(71) Applicant: Murata Manufacturing Co., Ltd., Nagaokakyo (JP)

(72) Inventors: Ryohei Takano, Nagaokakyo (JP); Makoto Yoshioka, Nagaokakyo (JP); Akisuke Ito, Nagaokakyo (JP); Takeo Ishikura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/592,805

(22) Filed: Mar. 1, 2024

(65) Prior Publication Data

US 2024/0250298 A1 Jul. 25, 2024

Related U.S. Application Data

(63) Continuation of application No. 16/702,917, filed on Dec. 4, 2019, now Pat. No. 11,955,596, which is a continuation of application No. PCT/JP2018/031938, filed on Aug. 29, 2018.

(30) Foreign Application Priority Data

Aug. 30, 2017 (JP) .................................. 2017-165458
Nov. 13, 2017 (JP) .................................. 2017-218078

(51) Int. Cl.
| | | |
|---|---|---|
| *H01M 10/0562* | (2010.01) | |
| *H01M 4/38* | (2006.01) | |
| *H01M 4/46* | (2006.01) | |
| *H01M 50/431* | (2021.01) | |
| *H01M 50/434* | (2021.01) | |
| *H01M 4/02* | (2006.01) | |

(52) U.S. Cl.
CPC ....... *H01M 10/0562* (2013.01); *H01M 4/382* (2013.01); *H01M 4/463* (2013.01); *H01M 4/466* (2013.01); *H01M 50/431* (2021.01); *H01M 50/434* (2021.01); *H01M 2004/027* (2013.01); *H01M 2004/028* (2013.01); *H01M 2300/0068* (2013.01); *H01M 2300/0071* (2013.01); *H01M 2300/0091* (2013.01)

(58) Field of Classification Search
CPC ........... H01M 10/0562; H01M 50/434; H01M 50/431; H01M 2300/0068; H01M 2300/071; H01M 2300/0091
See application file for complete search history.

(56) References Cited

U.S. PATENT DOCUMENTS

| | | | |
|---|---|---|---|
| 9,537,175 B2 | 1/2017 | Kintaka | |
| 10,361,452 B2 | 7/2019 | Nishizaki et al. | |
| 11,955,596 B2 * | 4/2024 | Takano | H01M 50/434 |
| 2011/0244337 A1 | 10/2011 | Ohta et al. | |
| 2014/0186720 A1 | 7/2014 | Kintaka | |
| 2014/0227614 A1 | 8/2014 | Lee et al. | |
| 2014/0308576 A1 | 10/2014 | Gaben et al. | |
| 2015/0044575 A1 | 2/2015 | Kawaji et al. | |
| 2015/0295224 A1 | 10/2015 | Onodera et al. | |
| 2016/0013513 A1 | 1/2016 | Gaben | |
| 2016/0156081 A1 * | 6/2016 | Wang | H01M 10/052 429/50 |
| 2016/0315346 A1 * | 10/2016 | Sasaki | H01M 10/0562 |
| 2017/0244103 A1 * | 8/2017 | Natsui | H01M 4/525 |
| 2018/0175446 A1 | 6/2018 | Nishizaki et al. | |
| 2019/0341601 A1 | 11/2019 | Park et al. | |
| 2020/0152925 A1 | 5/2020 | Gaben | |
| 2020/0266445 A1 | 8/2020 | Tsukada | |

FOREIGN PATENT DOCUMENTS

| | | | | |
|---|---|---|---|---|
| EP | 3076459 | * | 10/2016 | |
| EP | 3076459 A1 | * | 10/2016 | ........ H01M 10/0525 |
| EP | 3076469 | * | 10/2016 | |
| EP | 3076469 A2 | * | 10/2016 | ........ H01M 10/0525 |
| JP | 2012059529 A | | 3/2012 | |
| JP | 2013037992 A | | 2/2013 | |
| JP | 2014170734 A | | 9/2014 | |
| JP | 2015056326 A | | 3/2015 | |
| JP | 2015204215 A | | 11/2015 | |
| JP | 2016110792 A | | 6/2016 | |
| JP | 2016184483 A | | 10/2016 | |
| JP | 2017033926 A | | 2/2017 | |
| JP | 2017103163 A | | 6/2017 | |
| WO | 2018052371 A1 | | 3/2018 | |
| WO | 2018123479 A1 | | 7/2018 | |

OTHER PUBLICATIONS

International Search Report in PCT/JP2018/031938, mailed Nov. 27, 2018, 3 pages.
International Search Report in PCT/JP2018/031939, mailed Nov. 27, 2018, 3 pages.
Written Opinion in PCT/JP2018/031938, mailed Nov. 27, 2018, 4 pages.
Written Opinion in PCT/JP2018/031939, mailed Nov. 27, 2018, 3 pages.

* cited by examiner

*Primary Examiner* — Laura Weiner
(74) *Attorney, Agent, or Firm* — ArentFox Schiff LLP

(57) ABSTRACT

A solid electrolyte that includes a lithium ion conductive material having a garnet-type structure, a lithium ion conductive material having a LISICON-type structure, and a compound containing Li and B.

9 Claims, 1 Drawing Sheet

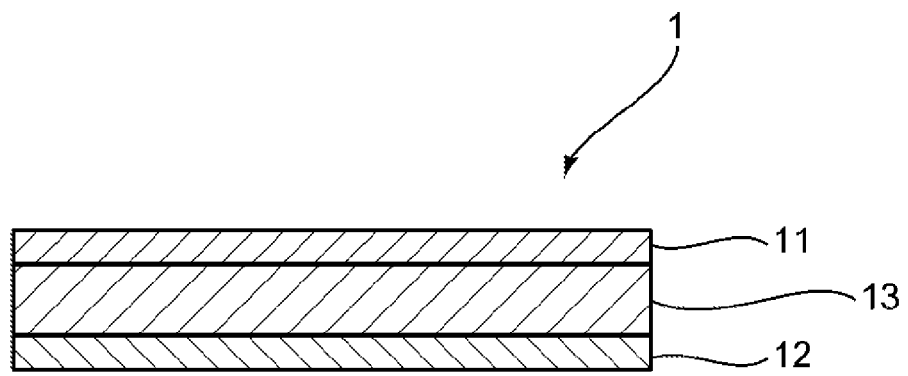

SOLID ELECTROLYTE AND ALL SOLID STATE BATTERY

CROSS REFERENCE TO RELATED APPLICATIONS

The present application is a continuation of application Ser. No. 16/702,917, filed Dec. 4, 2019, which is a continuation of International application No. PCT/JP2018/031938, filed Aug. 29, 2018, which claims priority to Japanese Patent Application No. 2017-165458, filed Aug. 30, 2017, and Japanese Patent Application No. 2017-218078, filed Nov. 13, 2017, the entire contents of each of which are incorporated herein by reference.

FIELD OF THE INVENTION

The present invention relates to a solid electrolyte and an all solid state battery.

BACKGROUND OF THE INVENTION

Conventionally, an all solid state battery has been known as a battery that is excellent in reliability and safety. For example, Patent Document 1 describes a solid electrolyte that contains a garnet-type lithium ion conductive material and $Li_3BO_3$ as base materials and can be sintered at low temperatures.

Patent Document 1: Japanese Patent Application Laid-Open No. 2013-37992

SUMMARY OF THE INVENTION

As a result of intensive studies, the present inventors have found that an ionic conductivity cannot be sufficiently increased when the solid electrolyte described in Patent Document 1 is fired at low temperatures.

A main object of the present invention is to provide a fixed electrolyte and an all solid state battery that can achieve a high ionic conductivity even when fired at low temperatures.

The solid electrolyte according to the present invention includes a lithium ion conductive material having a garnet-type structure, a lithium ion conductive material having a LISICON-type structure, and a compound containing Li and B.

According to the present invention, it is possible to provide a fixed electrolyte and an all solid state battery that can achieve a high ionic conductivity even when fired at low temperatures.

BRIEF EXPLANATION OF THE DRAWING

The FIGURE is a schematic cross-sectional view of an all solid state battery according to an embodiment of the present invention.

DETAILED DESCRIPTION OF THE PREFERRED EMBODIMENTS OF THE INVENTION

Hereinafter, a description will be given of an example of a preferred embodiment of the present invention. However, the following embodiments are provided merely by way of example. The present invention is not limited to the following embodiments.

The FIGURE is a schematic cross-sectional view of a co-fired type all solid state battery 1 according to the present embodiment.

As shown in the FIGURE, a positive electrode 11, a negative electrode 12, and a solid electrolyte layer 13 are provided. The solid electrolyte layer 13 is provided on the negative electrode 12. The solid electrolyte layer 13 is in contact with the negative electrode 12. The positive electrode 11 is provided on the solid electrolyte layer 13. The positive electrode 11 is in contact with the solid electrolyte layer 13. That is, the solid electrolyte layer 13 is sandwiched between the positive electrode 11 and the negative electrode 12. Each of the positive electrode 11 and the negative electrode 12 is joined to the solid electrolyte layer 13 by sintering. That is, the positive electrode 11, the solid electrolyte layer 13, and the negative electrode 12 form an integral sintered body.

(Positive Electrode 11)

The positive electrode 11 includes positive electrode active material particles. Examples of positive electrode active material particles preferably used include lithium-containing phosphate compound particles having a nasicon-type structure, lithium-containing phosphate compound particles having an olivine type structure, lithium-containing layered oxide particles, and lithium-containing oxide particles having a spinel type structure. Specific examples of the lithium-containing phosphate compound having a nasicon-type structure preferably used include $Li_3V_2(PO_4)_3$. Specific examples of the lithium-containing phosphate compound having an olivine-type structure preferably used include $Li_3Fe_2(PO_4)_3$ and $LiMnPO_4$. Specific examples of the lithium-containing layered oxide particles preferably used include $LiCoO_2$, and $LiCo_{1/3}Ni_{1/3}Mn_{1/3}O_2$. Specific examples of the lithium-containing oxide having a spinel-type structure preferably used include $LiMn_2O_4$, $LiNi_{0.5}Mn_{1.5}O_4$ and $Li_4Ti_5O_{12}$. Among these positive electrode active material particles, in the present embodiment using the following negative electrode active material and garnet-type lithium ion conductive material, a lithium-containing layered oxide such as $LiCoO_2$ or $LiCo_{1/3}Ni_{1/3}Mn_{1/3}O_2$ is more preferably used. Only one kind of these positive electrode active material particles may be used, or a plurality of types of these positive electrode active material particles may be mixed and used.

The positive electrode 11 may further contain a solid electrolyte. The type of the solid electrolyte contained in the positive electrode 11 is not particularly limited; however, it is preferred to contain the same type of solid electrolyte as the solid electrolyte contained in the solid electrolyte layer 13 described later.

In addition to the positive electrode active material, the positive electrode 11 may further include, for example, a conductive aid, a sintering aid, and the like.

Examples of conductive aids preferably used include metallic materials such as Ag, Au, Pd, Pt, Cu, and Sn, and carbon materials such as carbon nanotubes such as acetylene black, ketjen black, Super P, and VGCF (registered trademark).

As sintering aids preferably used, it is preferable that Li, M and O (M is at least one element excluding Li and O) be contained, that is, Li, M (M is at least one element excluding Li and O) composite oxide be preferably used. It is more preferable that the sintering aid contain Li, B and O, that is, the sintering aid be a composite oxide containing Li and B. Examples of such a composite oxide include $Li_3BO_3$, $Li_4B_2O_5$, $LiBO_2$, and $Li_{2+x}C_{1-x}B_xO_3$ ($0<x<1$).

(Negative Electrode 12)

The negative electrode 12 includes negative electrode active material particles. As the negative electrode active material preferably used, specific examples of the negative electrode active material preferably used include a composite oxide which contains Li and V and in which a molar ratio of Li content (Li/V) is 2.0 or more, graphite-lithium compound particles, lithium metal, and lithium alloy particles. Specific examples of the lithium alloy preferably used include Li—Al alloys. Examples of the composite oxides containing Li and V, preferably used include $Li_3VO_4$, $Li_{3.2}V_{0.8}Si_{0.2}O_4$, $Li_{3.2}V_{0.8}Ge_{0.2}O_4$, $Li_{3.2}V_{0.7}Ti_{0.3}O_4$, $Li_{2.7}Al_{0.1}VO_4$, $Li_{2.4}Al_{0.2}VO_4$, $Li_{2.7}Ga_{0.1}VO_4$, $Li_{2.8}Zn_{0.1}VO_4$, $Li_{2.0}Zn_{0.5}VO_4$, $Li_{3.0}Zn_{0.1}V_{0.8}Si_{0.2}O_4$, and $Li_{3.0}V_{0.7}P_{0.3}O_4$. Only one kind of these negative electrode active material particles may be used, or a plurality of types of these negative electrode active material particles may be mixed and used.

The negative electrode 12 may further contain a solid electrolyte. The type of the solid electrolyte contained in the negative electrode 12 is not particularly limited; however, it is preferred to contain the same type of solid electrolyte as the solid electrolyte contained in the solid electrolyte layer 13 described later.

In addition to the negative electrode active material, the negative electrode 12 may further include, for example, a conductive aid, a sintering aid, and the like.

Examples of conductive aids preferably used include metallic materials such as Ag, Au, Pd, Pt, Cu, and Sn, and carbon materials such as carbon nanotubes such as acetylene black, ketjen black, Super P, and VGCF (registered trademark).

As sintering aids preferably used, it is preferable that Li, M and O (M is at least one element excluding Li and O) be contained, that is, Li, M (M is at least one element excluding Li and O) composite oxide be preferably used. It is more preferable that the sintering aid contain Li, B and O, that is, the sintering aid be a composite oxide containing Li and B. Specific examples of the composite oxide containing Li and B include $Li_3BO_3$, $Li_4B_2O_5$, $LiBO_2$, and $Li_{2+x}C_{1-x}B_xO_3$ (0<x<1).

(Solid Electrolyte Layer 13)

The solid electrolyte layer 13 is a layer containing a solid electrolyte. The solid electrolyte contained in the solid electrolyte layer 13 includes a first lithium ion conductive material having a garnet-type structure, a second lithium ion conductive material having a LISICON-type structure, and a compound containing Li and B.

Example of the lithium ion conductive material having a LISICON-type structure include materials represented by a composition formula $(Li_{[3-ax+(5-b)]}A_x)MO_4$ (where A is at least one element selected from the group consisting of Mg, Al, Ga and Zn, M is at least one element selected from the group consisting of Zn, Al, Ga, Si, Ge, Ti, P and V, 0≤x<1.0, a is an average valence of A, and b is an average valence of M).

Examples of the LISICON-type lithium ion conductive material preferably used include $Li_{3.2}(V_{0.8}Si_{0.2})O_4$, $Li_{3.4}(V_{0.6}Si_{0.4})O_4$, $Li_{3.4}(V_{0.8}Ge_{0.4})O_4$, $Li_{3.5}(Ge_{0.5}P_{0.5})O_4$, $Li_{3.5}(P_{0.5}Si_{0.5})O_4$, and $(Li_{3.3}Al_{0.03})(V_{0.6}Si_{0.4})O_4$.

Examples of the lithium ion conductive material having a garnet-type structure include materials represented by a composition formula $(Li_{[7-ax-(b-4)y]}A_x)La_3Zr_{(2-y)}B_yO_{12}$ (A is at least one element selected from the group consisting of Ga, Al, Mg, Zn and Sc, B is at least one element selected from the group consisting of Nb, Ta, W, Te, Mo and Bi, 0≤x≤0.5, 0≤y≤2.0, a is an average valence of A, and b is an average valence of B).

Examples of lithium ion conductive materials having a garnet-type structure, preferably used include $(Li_{6.4}Ga_{0.05}Al_{0.15})La_3Zr_2O_{12}$, $(Li_{6.4}Al_{0.2})La_3Zr_2O_{12}$, $(Li_{6.4}Ga_{0.15}Sc_{0.05})La_3Zr_2O_{12}$, $Li_{6.75}La_3(Zr_{1.75}Nb_{0.25})O_{11}$, $(Li_{6.45}Al_{0.1})La_3(Zr_{1.75}Nb_{0.25})O_{12}$, $(Li_{6.175}Al_{0.1})La_3(Zr_{1.475}Ta_{0.105}Bi_{0.42})O_{12}$, and $Li_{6.6}La_3(Zr_{1.6}Ta_{0.4})O_{12}$.

The compound containing Li and B is preferably an oxide containing Li and B. Examples of oxides containing Li and B, preferably used include $Li_3BO_3$, $Li_4B_2O_5$, $Li_{2.7}Al_{0.1}BO_3$, and $Li_{2.2}B_{0.8}C_{0.2}O_3$.

In the compound containing Li and B, a molar ratio of Li to B (Li/B) is preferably 2.0 or more. However, if the molar ratio (Li/B) is too high, Li salts having a low lithium ionic conductivity such as $Li_2CO_3$ and LiOH may tend to be released. Therefore, the molar ratio of Li to B (Li/B) is preferably 6.5 or less.

When a volume ratio of the lithium ion conductive material having a garnet-type structure is X, a volume ratio of the lithium ion conductive material having a LISICON-type structure is Y, and a volume ratio of the oxide containing Li and B is Z, preferably, 10%≤X≤89.5%, 10%≤Y≤89.5%, 0.5%≤Z≤30%, and X+Y+Z≤100%, more preferably, 37%≤X≤70%, 20%≤Y≤60%, 3.0%≤Z≤20%, and 80%≤X+Y+Z≤100% are satisfied.

The solid electrolyte layer 13 may further include other components other than the garnet-type lithium ion conductive material, a LISICON-type lithium ion conductive material, and the compound containing Li and B. The other components are not particularly limited, but are preferably those that do not undergo side reactions during co-firing with each of the garnet-type lithium ion conductive material, the LISICON-type lithium ion conductive material, and the compound containing Li and B. Examples of other components preferably used include $Li_2ZrO_3$, $ZrO_2$, $Al_2O_3$, and $La_2Zr_2O_7$.

As described above, the solid electrolyte according to the present embodiment includes the lithium ion conductive material having a garnet-type structure, the lithium ion conductive material having a LISICON-type structure, and the compound containing Li and B. For this reason, as can be seen from the following examples and comparative examples, according to the solid electrolyte of the present embodiment, a high ionic conductivity can be achieved even when firing at low temperatures. Although the reason for this is not known exactly, there is a possible reason below. That is, it is thought that this is because, since the LISICON-type lithium ion conductive material has high wettability with both the compound containing Li and B and the garnet-type lithium ion conductive material, liquid-phase sintering is promoted and densification is promoted at lower temperatures.

The following reasons can be considered as a reason why a high ionic conductivity is achieved when firing at low temperatures. It is difficult for a solid phase reaction to proceed between the LISICON-type lithium ion conductive material and garnet-type lithium ion conductive material. For this reason, it is difficult to form a heterogeneous phase that inhibits ion conduction. Thus, it is thought that this is because Li-ion conduction resistance between the LISICON-type lithium ion conductive material and the garnet-type lithium ion conductive material is lowered. In other words, it is thought that this is because by causing the garnet-type lithium ion conductive material and the LISI- CON-type lithium ion conductive material to coexist, each side reaction hardly occurs and the crystal structure is maintained.

(Method for Manufacturing all Solid State Battery 1)

Next, an example of a method for manufacturing the all solid state battery 1 will be described.

First, a paste is prepared by appropriately mixing a solvent, a resin, and the like with active material particles and a solid electrolyte. The paste is applied onto a sheet and dried to form a first green sheet for constituting the positive electrode 11. Similarly, a second green sheet for forming the negative electrode 12 is formed.

The first and second green sheets may contain a conductive aid, a sintering aid, and the like.

A paste is prepared by appropriately mixing a solvent, a resin, and the like with a solid electrolyte. The paste is applied and dried to prepare a third green sheet for constituting the solid electrolyte layer 13.

Next, the first to third green sheets are appropriately laminated to prepare a laminate. The prepared laminate may be pressed. Preferred pressing methods include isostatic pressing.

Thereafter, the all solid state battery 1 can be obtained by sintering the laminate.

The present invention will be described in more detail below based on specific examples, but the present invention is not limited to the following examples at all, and variations and modifications may be appropriately made without departing from the gist of the invention.

Comparative Example 1

[Production of Garnet-Type Lithium Ion Conductive Material Powder]

A raw material containing lithium hydroxide monohydrate ($LiOH \cdot H_2O$), gallium oxide ($Ga_2O_3$), aluminum oxide ($Al_2O_3$), lanthanum hydroxide ($La(OH)_3$), and zirconium oxide ($ZrO_2$) was weighed so that the composition of the solid electrolyte was as shown in Table 1 below. Next, water was added, and the resultant was enclosed in a 100 ml polyethylene pot made of polyethylene and rotated on a pot rack at 150 rpm for 16 hours to mix the raw materials. In addition, lithium hydroxide monohydrate ($LiOH \cdot H_2O$) as a Li source was charged in excess of 3% by mass with respect to the target composition in consideration of Li deficiency at the time of sintering.

Then, the resulting slurry was dried and then calcined at 1000° C. for 5 hours. Next, a mixed solvent of toluene and acetone was added to the resulting calcined product, and the mixture was pulverized with a planetary ball mill for 12 hours to obtain a garnet-type lithium ion conductive material powder having the composition shown in Table 1.

When the obtained lithium ion conductive material powder was observed using a scanning electron microscope (SEM), the particle size of the lithium ion conductive material powder was about 0.5 μm.

[Production of Compound Powder Containing Li and B]

A raw material containing lithium hydroxide monohydrate ($LiOH \cdot H_2O$) and boron oxide ($B_2O_3$) was weighed so as to have the composition shown in Table 1 below. The weighed raw materials were mixed using an agate mortar.

Next, the mixed raw materials were calcined at 600° C. for 5 hours. Next, a mixed solvent of toluene and acetone was added to the resulting calcined product, and the mixture was pulverized with a planetary ball mill for 12 hours to obtain a compound powder containing Li and B.

[Preparation of Solid Electrolyte Tablet]

The garnet-type lithium ion conductive material powder produced by the above procedure and the compound powder containing Li and B were weighed so as to have the volume ratio shown in Table 1.

The weighed raw materials were mixed using a mortar to obtain a mixture.

Next, the obtained mixture, a butyral resin and alcohol were mixed at a weight ratio of 200:15:140, and then alcohol was removed on a hot plate at 80° C. to obtain a mixed powder coated with the butyral resin serving as a binder.

Next, the mixed powder coated with the butyral resin was pressed at 90 MPa using a tablet molding machine, and formed into a tablet shape. The resulting tablet was heated at a temperature of 500° C. in an oxygen atmosphere to remove the butyral resin. Thereafter, the mixture was fired at 750° C. for 10 hours in an air atmosphere. Thereafter, a sintered tablet of the solid electrolyte was obtained by lowering the temperature to room temperature.

Comparative Example 2

[Production of LISICON-Type Lithium Ion Conductive Material Powder]

A raw material containing lithium hydroxide monohydrate ($LiOH \cdot H_2O$), vanadium oxide ($V_2O_5$), and silicon oxide ($SiO_2$) was weighed so that the composition of the lithium ion conductive material was as shown in Table 1 below. Next, water was added, and the resultant was enclosed in a 100 ml polyethylene pot made of polyethylene and rotated on a pot rack at 150 rpm for 16 hours to mix the raw materials. In addition, lithium hydroxide monohydrate ($LiOH \cdot H_2O$) as a Li source was charged in excess of 3% by mass with respect to the target composition in consideration of Li deficiency at the time of sintering.

Then, the resulting slurry was dried and then calcined at 800° C. to 1000° C. for 5 hours. Next, a mixed solvent of toluene and acetone was added to the resulting calcined product, and the mixture was pulverized with a planetary ball mill for 12 hours to obtain a LISICON-type lithium ion conductive material powder having the composition shown in Table 1.

[Production of Compound Powder Containing Li and B]

In the same manner as in Comparative Example 1, a compound powder containing Li and B was obtained.

[Preparation of Solid Electrolyte Tablet]

The LISICON-type lithium ion conductive material powder produced by the above procedure and the compound powder containing Li and B were weighed so as to have the volume ratio shown in Table 1. The weighed raw materials were mixed using a mortar to obtain a mixture.

Next, the obtained mixture, a butyral resin and alcohol were mixed at a weight ratio of 200:15:140, and then alcohol was removed on a hot plate at 80° C. to obtain a mixed powder coated with the butyral resin serving as a binder.

Next, the mixed powder coated with the butyral resin was pressed at 90 MPa using a tablet molding machine, and formed into a tablet shape. The resulting tablet was heated at a temperature of 500° C. in an oxygen atmosphere to remove the butyral resin. Thereafter, the mixture was fired at 750° C. for 10 hours in an air atmosphere. Thereafter, a sintered tablet of the solid electrolyte was obtained by lowering the temperature to room temperature.

Comparative Example 3

[Production of Garnet-Type Lithium Ion Conductive Material Powder]

In the same manner as in Comparative Example 1, a garnet-type lithium ion conductive material powder was obtained.

[Production of LISICON-Type Lithium Ion Conductive Material Powder]

In the same manner as in Comparative Example 2, a LISICON-type lithium ion conductive material powder was obtained.

[Preparation of Solid Electrolyte Tablet]

The garnet-type lithium ion conductive material powder and the LISICON-type lithium ion conductive material powder produced by the above procedure were weighed so as to have the volume ratio shown in Table 1. The weighed raw materials were mixed using a mortar to obtain a mixture.

Next, the obtained mixture, a butyral resin and alcohol were mixed at a weight ratio of 200:15:140, and then alcohol was removed on a hot plate at 80° ° C. to obtain a mixed powder coated with the butyral resin serving as a binder.

Next, the mixed powder coated with the butyral resin was pressed at 90 MPa using a tablet molding machine, and formed into a tablet shape. The resulting tablet was heated and fired at a temperature of 500° C. in an oxygen atmosphere to remove the butyral resin. Thereafter, the mixture was fired at 750° C. for 10 hours in an air atmosphere. Thereafter, a sintered tablet of the solid electrolyte was obtained by lowering the temperature to room temperature.

Example 1

[Production of Garnet-Type Lithium Ion Conductive Material Powder]

In the same manner as in Comparative Example 1, a garnet-type lithium ion conductive material powder was obtained.

[Production of LISICON-Type Lithium Ion Conductive Material Powder]

In the same manner as in Comparative Example 2, a LISICON-type lithium ion conductive material powder was obtained.

[Production of Compound Powder Containing Li and B]

In the same manner as in Comparative Example 1, a compound powder containing Li and B was obtained.

[Preparation of Solid Electrolyte Tablet]

The garnet-type lithium ion conductive material powder, the LISICON-type lithium ion conductive material powder, and the compound powder containing Li and B produced by the above procedure were weighed so as to have the volume ratio shown in Table 1. The weighed raw materials were mixed using a mortar to obtain a mixture.

Next, the obtained mixture, a butyral resin and alcohol were mixed at a weight ratio of 200:15:140, and then alcohol was removed on a hot plate at 80° ° C. to obtain a mixed powder coated with the butyral resin serving as a binder.

Next, the mixed powder coated with the butyral resin was pressed at 90 MPa using a tablet molding machine, and formed into a tablet shape. The resulting tablet was heated at a temperature of 500° C. in an oxygen atmosphere to remove the butyral resin. Thereafter, the mixture was fired at 750° C. for 10 hours in an air atmosphere. Thereafter, a sintered tablet of the solid electrolyte was obtained by lowering the temperature to room temperature.

Example 2

A sintered tablet of a solid electrolyte was obtained in the same manner as in Example except that the firing temperature of the tablet was 700° C.

Example 3

A sintered tablet of a solid electrolyte was obtained in the same manner as in Example 1 except that the garnet-type lithium ion conductive material powder, the LISICON-type lithium ion conductive material powder, and the compound powder containing Li and B were weighed so as to have the volume ratio shown in Table 2.

Example 4

A sintered tablet of a solid electrolyte was obtained in the same manner as in Example 1 except that the garnet-type lithium ion conductive material powder, the LISICON-type lithium ion conductive material powder, and the compound powder containing Li and B were weighed so as to have the volume ratio shown in Table 2.

Example 5

A sintered tablet of a solid electrolyte was obtained in the same manner as in Example 1 except that the garnet-type lithium ion conductive material powder, the LISICON-type lithium ion conductive material powder, and the compound powder containing Li and B were weighed so as to have the volume ratio shown in Table 2.

Example 6

A sintered tablet of a solid electrolyte was obtained in the same manner as in Example 1 except that the garnet-type lithium ion conductive material powder, the LISICON-type lithium ion conductive material powder, and the compound powder containing Li and B were weighed so as to have the volume ratio shown in Table 2.

Example 7

A sintered tablet of a solid electrolyte was obtained in the same manner as in Example 1 except that the garnet-type lithium ion conductive material powder, the LISICON-type lithium ion conductive material powder, and the compound powder containing Li and B were weighed so as to have the volume ratio shown in Table 3.

Example 8

A sintered tablet of a solid electrolyte was obtained in the same manner as in Example 1 except that the garnet-type lithium ion conductive material powder, the LISICON-type lithium ion conductive material powder, and the compound powder containing Li and B were weighed so as to have the volume ratio shown in Table 3.

Example 9

A sintered tablet of a solid electrolyte was obtained in the same manner as in Example 1 except that the garnet-type lithium ion conductive material powder, the LISICON-type lithium ion conductive material powder, and the compound powder containing Li and B were weighed so as to have the volume ratio shown in Table 3.

Example 10

A sintered tablet of a solid electrolyte was obtained in the same manner as in Example 1 except that the garnet-type lithium ion conductive material powder, the LISICON-type lithium ion conductive material powder, and the compound powder containing Li and B were weighed so as to have the volume ratio shown in Table 3.

Example 11

A sintered tablet of a solid electrolyte was obtained in the same manner as in Example 1 except that in the production of the garnet-type lithium ion conductive material powder, a raw material containing lithium hydroxide monohydrate (LiOH·H$_2$O), lanthanum hydroxide (La(OH)$_3$), zirconium oxide (ZrO$_2$), and aluminum oxide (Al$_2$O$_3$) was weighed so as to have the composition shown in Table 4.

Example 12

A sintered tablet of a solid electrolyte was obtained in the same manner as in Example 1 except that in the production of the garnet-type lithium ion conductive material powder, a raw material containing lithium hydroxide monohydrate (LiOH·H$_2$O), gallium oxide (Ga$_2$O$_3$), scandium oxide (Sc$_2$O$_3$), lanthanum hydroxide (La(OH)$_3$), and zirconium oxide (ZrO$_2$) was weighed so as to have the composition shown in Table 4.

Example 13

A sintered tablet of a solid electrolyte was obtained in the same manner as in Example 1 except that in the production of the garnet-type lithium ion conductive material powder, a raw material containing lithium hydroxide monohydrate (LiOH·H$_2$O), lanthanum hydroxide (La(OH)$_3$), zirconium oxide (ZrO$_2$), and niobium oxide (Nb$_2$O$_5$) was weighed so as to have the composition shown in Table 4.

Example 14

A sintered tablet of a solid electrolyte was obtained in the same manner as in Example 1 except that in the production of the garnet-type lithium ion conductive material powder, a raw material containing lithium hydroxide monohydrate (LiOH·H$_2$O), aluminum oxide (Al$_2$O$_3$), lanthanum hydroxide (La(OH)$_3$), zirconium oxide (ZrO$_2$), and niobium oxide (Nb$_2$O$_5$) was weighed so as to have the composition shown in Table 4.

Example 15

A sintered tablet of a solid electrolyte was obtained in the same manner as in Example 1 except that in the production of the garnet-type lithium ion conductive material powder, a raw material containing lithium hydroxide monohydrate (LiOH·H$_2$O), aluminum oxide (Al$_2$O$_3$), lanthanum hydroxide (La(OH)$_3$), zirconium oxide (ZrO$_2$), tantalum oxide (Ta$_2$O$_5$), and bismuth oxide (Bi$_2$O$_3$) was weighed so as to have the composition shown in Table 4.

Example 16

A sintered tablet of a solid electrolyte was obtained in the same manner as in Example 1 except that in the production of the garnet-type lithium ion conductive material powder, a raw material containing lithium hydroxide monohydrate (LiOH·H$_2$O), lanthanum hydroxide (La(OH)$_3$), zirconium oxide (ZrO$_2$), and tantalum oxide (Ta$_2$O$_5$) was weighed so as to have the composition shown in Table 4.

Example 17

A sintered tablet of a solid electrolyte was obtained in the same manner as in Example 1 except that in the production of the compound powder containing Li and B, a raw material containing lithium hydroxide monohydrate (LiOH·H$_2$O) and boron oxide (B$_2$O$_3$) was weighed so as to have the composition shown in Table 4 below.

Example 18

A sintered tablet of a solid electrolyte was obtained in the same manner as in Example 1 except that in the production of the compound powder containing Li and B, a raw material containing lithium hydroxide monohydrate (LiOH·H$_2$O), boron oxide (B$_2$O$_3$), and aluminum oxide (Al$_2$O$_3$) was weighed so as to have the composition shown in Table 4 below.

Example 19

A sintered tablet of a solid electrolyte was obtained in the same manner as in Example 1 except that in the production of the compound powder containing Li and B, a raw material containing lithium hydroxide monohydrate (LiOH·H$_2$O), boron oxide (B$_2$O$_3$), and lithium carbonate (Li$_2$CO$_3$) was weighed so as to have the composition shown in Table 4 below.

Example 20

A sintered tablet of a solid electrolyte was obtained in the same manner as in Example 1 except that in the production of the LISICON-type lithium ion conductive material powder, a raw material containing lithium hydroxide monohydrate (LiOH·H$_2$O), vanadium oxide (V$_2$O$_5$), and silicon oxide (SiO$_2$) was weighed so that the composition of the solid electrolyte was as shown in Table 4 below and except that the garnet-type lithium ion conductive material powder, the LISICON-type lithium ion conductive material powder, and the compound powder containing Li and B were weighed so as to have the volume ratio shown in Table 4.

Example 21

A sintered tablet of a solid electrolyte was obtained in the same manner as in Example 1 except that in the production of the LISICON-type lithium ion conductive material powder, a raw material containing lithium hydroxide monohydrate (LiOH·H$_2$O), vanadium oxide (V$_2$O$_5$), and silicon oxide (SiO$_2$) was weighed so that the composition of the solid electrolyte was as shown in Table 4 below.

Example 22

A sintered tablet of a solid electrolyte was obtained in the same manner as in Example 1 except that in the production of the LISICON-type lithium ion conductive material powder, a raw material containing lithium hydroxide monohydrate (LiOH·H$_2$O), vanadium oxide (V$_2$O$_5$), and germanium oxide (GeO$_2$) was weighed so that the composition of the solid electrolyte was as shown in Table 4 below.

Example 23

A sintered tablet of a solid electrolyte was obtained in the same manner as in Example 1 except that in the production of the LISICON-type lithium ion conductive material powder, a raw material containing lithium hydroxide monohydrate (LiOH·H$_2$O), germanium oxide (GeO$_2$), and phosphorus oxide (P$_2$O$_5$) was weighed so that the composition of the solid electrolyte was as shown in Table 4 below.

Example 24

A sintered tablet of a solid electrolyte was obtained in the same manner as in Example 1 except that in the production of the LiSICON-type lithium ion conductive material powder, a raw material containing lithium hydroxide monohydrate (LiOH·H$_2$O), phosphorus oxide (P$_2$O$_5$), and silicon oxide (SiO$_2$) was weighed so that the composition of the solid electrolyte was as shown in Table 4 below and except that the garnet-type lithium ion conductive material powder, the LISICON-type lithium ion conductive material powder, and the compound powder containing Li and B were weighed so as to have the volume ratio shown in Table 4.

Example 25

A sintered tablet of a solid electrolyte was obtained in the same manner as in Example 1 except that in the production of the LISICON-type lithium ion conductive material powder, a raw material containing lithium hydroxide monohydrate (LiOH·H$_2$O), aluminum oxide (Al$_2$O$_3$), vanadium oxide (V$_2$O$_5$), and silicon oxide (SiO$_2$) was weighed so that the composition of the solid electrolyte was as shown in Table 4 below.

[Measurement of Relative Density]

The weights of the solid electrolyte sintered tablets produced in Examples 1 to 25 and Comparative Examples 1 to 3 were measured using an electronic balance. Next, the volume was measured from the actual size of the sintered tablet using a micrometer.

The density of the sintered tablet was calculated by dividing the measured weight by the volume, and a relative density (%) was determined from a ratio between a theoretical value of the density of the solid electrolyte and a measured value of the density of the solid electrolyte. The results are shown in Tables 1 to 4. The theoretical value of the density of the solid electrolyte was calculated from a theoretical density and a volume ratio calculated from lattice volume and molar mass of the garnet-type lithium ion conductive material, the LISICON-type lithium ion conductive material, and the compound containing Li and B constituting the solid electrolyte.

[Measurement of Ionic Conductivity]

Platinum (Pt) layers serving as current collector layers were formed by sputtering on both surfaces of the sintered tablet of the solid electrolyte produced in each of Examples 1 to 25 and Comparative Examples 1 to 3. Then, the sintered tablet formed with the platinum layers was sandwiched by a SUS current collector and thereby fixed.

Next, for each sintered tablet of the solid electrolyte, an AC impedance was measured at room temperature (25° C.) in the range of 0.1 MHz or more and 1 MHz or less (±50 mV) to obtain a Nyquist plot.

From the obtained Nyquist plot, the resistance of the entire electrolyte including intragranular and grain boundaries was measured to calculate the ionic conductivity. The results are shown in Tables 1 to 4.

TABLE 1

| | Garnet-type lithium ion conductive material | LISICON-type lithium ion conductive material | Compound containing Li and B | Volume ratio | | | Firing temperature (° C.) | Relative density (%) | Ionic conductivity (S/cm) |
| | | | | X (%) | Y (%) | Z (%) | | | |
| --- | --- | --- | --- | --- | --- | --- | --- | --- | --- |
| Comparative Example 1 | (Li$_{6.4}$Ga$_{0.05}$Al$_{0.15}$)La$_3$Zr$_2$O$_{12}$ | — | Li$_3$BO$_3$ | 85 | 0 | 15 | 750 | 64 | 8.0 × 10$^{-6}$ |
| Comparative Example 2 | — | Li$_{3.2}$(V$_{0.8}$Si$_{0.2}$)O$_4$ | Li$_3$BO$_3$ | 0 | 85 | 15 | 750 | 97 | 9.0 × 10$^{-6}$ |
| Comparative Example 3 | (Li$_{6.4}$Ga$_{0.05}$Al$_{0.15}$)La$_3$Zr$_2$O$_{12}$ | Li$_{3.2}$(V$_{0.8}$Si$_{0.2}$)O$_4$ | — | 50 | 50 | 0 | 750 | 58 | 8.7 × 10$^{-7}$ |
| Example 1 | (Li$_{6.4}$Ga$_{0.05}$Al$_{0.15}$)La$_3$Zr$_2$O$_{12}$ | Li$_{3.2}$(V$_{0.8}$Si$_{0.2}$)O$_4$ | Li$_3$BO$_3$ | 42.5 | 42.5 | 15 | 750 | 95 | 3.2 × 10$^{-5}$ |
| Example 2 | (Li$_{6.4}$Ga$_{0.05}$Al$_{0.15}$)La$_3$Zr$_2$O$_{12}$ | Li$_{3.2}$(V$_{0.8}$Si$_{0.2}$)O$_4$ | Li$_3$BO$_3$ | 42.5 | 42.5 | 15 | 700 | 93 | 2.6 × 10$^{-5}$ |

The results of Example 1 showed that in the solid electrolyte containing the garnet-type lithium ion conductive material, the LISICON-type lithium ion conductive material, and the compound containing Li and B, a high relative density and a high ionic conductivity were obtained even at a low firing temperature of 750° C. Further, the results of Example 2 showed that even when the firing temperature was 700° C., a high relative density and a high ionic conductivity were obtained.

On the other hand, the results of Comparative Examples 1 to 3 showed that when the solid electrolyte was free of all of the garnet-type lithium ion conductive material, the LISICON-type lithium ion conductive material, and the compound containing Li and B at a firing temperature of 750° C., the relative density was low and the ionic conductivity was reduced.

TABLE 2

| | Garnet-type solid electrolyte | LISICON-type solid electrolyte | Compound containing Li and B | Volume ratio X (%) | Volume ratio Y (%) | Volume ratio Z (%) | Firing temperature (° C.) | Relative density (%) | Ionic conductivity (S/cm) |
|---|---|---|---|---|---|---|---|---|---|
| Comparative Example 1 | $(Li_{6.4}Ga_{0.05}Al_{0.15})La_3Zr_2O_{12}$ | — | $Li_3BO_3$ | 85 | 0 | 15 | 750 | 64 | $8.0 \times 10^{-6}$ |
| Example 3 | $(Li_{6.4}Ga_{0.05}Al_{0.15})La_3Zr_2O_{12}$ | $Li_{3.2}(V_{0.8}Si_{0.2})O_4$ | $Li_3BO_3$ | 74.75 | 10.25 | 15 | 750 | 78 | $1.6 \times 10^{-5}$ |
| Example 4 | $(Li_{6.4}Ga_{0.05}Al_{0.15})La_3Zr_2O_{12}$ | $Li_{3.2}(V_{0.8}Si_{0.2})O_4$ | $Li_3BO_3$ | 63.75 | 21.25 | 15 | 750 | 86 | $4.0 \times 10^{-5}$ |
| Example 5 | $(Li_{6.4}Ga_{0.05}Al_{0.15})La_3Zr_2O_{12}$ | $Li_{3.2}(V_{0.8}Si_{0.2})O_4$ | $Li_3BO_3$ | 56.2 | 28.8 | 15 | 750 | 95 | $6.2 \times 10^{-5}$ |
| Example 1 | $(Li_{6.4}Ga_{0.05}Al_{0.15})La_3Zr_2O_{12}$ | $Li_{3.2}(V_{0.8}Si_{0.2})O_4$ | $Li_3BO_3$ | 42.5 | 42.5 | 15 | 750 | 95 | $3.2 \times 10^{-5}$ |
| Example 6 | $(Li_{6.4}Ga_{0.05}Al_{0.15})La_3Zr_2O_{12}$ | $Li_{3.2}(V_{0.8}Si_{0.2})O_4$ | $Li_3BO_3$ | 21.25 | 63.75 | 15 | 750 | 97 | $1.8 \times 10^{-5}$ |
| Comparative Example 2 | — | $Li_{3.2}(V_{0.8}Si_{0.2})O_4$ | $Li_3BO_3$ | 0 | 85 | 15 | 750 | 97 | $9.0 \times 10^{-6}$ |

The results shown in Table 2 showed that when the volume ratio of the LISICON-type lithium ion conductive material was 10% or more, the relative density was increased and a high ionic conductivity was obtained. In particular, it was found that when the volume ratio (X (%)) of the garnet-type lithium ion conductive material was 37%≤X≤70% and the volume ratio (Y (%)) of the LISICON-type lithium ion conductive material was 20%≤Y≤60%, a high ionic conductivity was obtained.

compositions were used, high relative density was obtained and a high ionic conductivity could be achieved.

The results of Examples 17 and 18 showed that even when various compounds containing Li and B were used, a high ionic conductivity could be achieved. The results further showed that in the compound containing Li and B, when the molar ratio of Li to B (Li/B) was 2.0 or more, a high ionic conductivity was obtained.

TABLE 3

| | Garnet-type solid electrolyte | LISICON-type solid electrolyte | Compound containing Li and B | Volume ratio X (%) | Volume ratio Y (%) | Volume ratio Z (%) | Firing temperature (° C.) | Relative density (%) | Ionic conductivity (S/cm) |
|---|---|---|---|---|---|---|---|---|---|
| Comparative Example 3 | $(Li_{6.4}Ga_{0.05}Al_{0.15})La_3Zr_2O_{12}$ | $Li_{3.2}(V_{0.8}Si_{0.2})O_4$ | — | 50 | 50 | 0 | 750 | 58 | $8.7 \times 10^{-7}$ |
| Example 7 | $(Li_{6.4}Ga_{0.05}Al_{0.15})La_3Zr_2O_{12}$ | $Li_{3.2}(V_{0.8}Si_{0.2})O_4$ | $Li_3BO_3$ | 48.5 | 48.5 | 3 | 750 | 92 | $2.8 \times 10^{-5}$ |
| Example 8 | $(Li_{6.4}Ga_{0.05}Al_{0.15})La_3Zr_2O_{12}$ | $Li_{3.2}(V_{0.8}Si_{0.2})O_4$ | $Li_3BO_3$ | 47.5 | 47.5 | 5 | 750 | 98 | $7.3 \times 10^{-5}$ |
| Example 9 | $(Li_{6.4}Ga_{0.05}Al_{0.15})La_3Zr_2O_{12}$ | $Li_{3.2}(V_{0.8}Si_{0.2})O_4$ | $Li_3BO_3$ | 45 | 45 | 10 | 750 | 98 | $3.4 \times 10^{-5}$ |
| Example 1 | $(Li_{6.4}Ga_{0.05}Al_{0.15})La_3Zr_2O_{12}$ | $Li_{3.2}(V_{0.8}Si_{0.2})O_4$ | $Li_3BO_3$ | 42.5 | 42.5 | 15 | 750 | 95 | $3.2 \times 10^{-5}$ |
| Example 10 | $(Li_{6.4}Ga_{0.05}Al_{0.15})La_3Zr_2O_{12}$ | $Li_{3.2}(V_{0.8}Si_{0.2})O_4$ | $Li_3BO_3$ | 37.5 | 37.5 | 25 | 750 | 97 | $1.0 \times 10^{-5}$ |

The results shown in Table 3 showed that a particularly high ionic conductivity was obtained when the volume ratio (Z (%)) of the compound containing Li and B was 3%≤Z≤20%.

The results of Examples 20 to 25 showed that even when various LiSICON-type lithium ion conductive materials were used, high relative density and a high ionic conductivity could be achieved.

TABLE 4

| | Garnet-type solid electrolyte | LISICON-type solid electrolyte | Compound containing Li and B | Volume ratio X (%) | Volume ratio Y (%) | Volume ratio Z (%) | Firing temperature (° C.) | Relative density (%) | Ionic conductivity (S/cm) |
|---|---|---|---|---|---|---|---|---|---|
| Example 11 | $(Li_{6.4}Al_{0.2})La_3Zr_2O_{12}$ | $Li_{3.2}(V_{0.8}Si_{0.2})O_4$ | $Li_3BO_3$ | 42.5 | 42.5 | 15 | 750 | 95 | $1.3 \times 10^{-5}$ |
| Example 12 | $(Li_{6.4}Ga_{0.15}Sc_{0.05})La_3Zr_2O_{12}$ | $Li_{3.2}(V_{0.8}Si_{0.2})O_4$ | $Li_3BO_3$ | 42.5 | 42.5 | 15 | 750 | 96 | $3.4 \times 10^{-5}$ |
| Example 13 | $Li_{6.75}La_3(Zr_{1.75}Nb_{0.25})O_{11}$ | $Li_{3.2}(V_{0.8}Si_{0.2})O_4$ | $Li_3BO_3$ | 42.5 | 42.5 | 15 | 750 | 95 | $2.0 \times 10^{-5}$ |
| Example 14 | $(Li_{6.4}Al_{0.1})La_3(Zr_{1.75}Nb_{0.25})O_{12}$ | $Li_{3.2}(V_{0.8}Si_{0.2})O_4$ | $Li_3BO_3$ | 42.5 | 42.5 | 15 | 750 | 94 | $1.8 \times 10^{-5}$ |
| Example 15 | $(Li_{6.175}Al_{0.1})La_3(Zr_{1.475}Ta_{0.105}Bi_{0.42})O_{12}$ | $Li_{3.2}(V_{0.8}Si_{0.2})O_4$ | $Li_3BO_3$ | 42.5 | 42.5 | 15 | 750 | 97 | $2.5 \times 10^{-5}$ |
| Example 16 | $Li_6La_3(Zr_{1.6}Ta_{0.4})O_{12}$ | $Li_{3.2}(V_{0.8}Si_{0.2})O_4$ | $Li_3BO_3$ | 42.5 | 42.5 | 15 | 750 | 94 | $3.4 \times 10^{-5}$ |
| Example 17 | $(Li_{6.4}Ga_{0.05}Al_{0.15})La_3Zr_2O_{12}$ | $Li_{3.2}(V_{0.8}Si_{0.2})O_4$ | $Li_4B_2O_5$ | 42.5 | 42.5 | 15 | 750 | 92 | $1.8 \times 10^{-5}$ |
| Example 18 | $(Li_{6.4}Ga_{0.05}Al_{0.15})La_3Zr_2O_{12}$ | $Li_{3.2}(V_{0.8}Si_{0.2})O_4$ | $Li_{2.7}Al_{0.1}BO_3$ | 42.5 | 42.5 | 15 | 750 | 94 | $4.2 \times 10^{-5}$ |
| Example 19 | $(Li_{6.4}Ga_{0.06}Al_{0.15})La_3Zr_2O_{12}$ | $Li_{3.2}(V_{0.8}Si_{0.2})O_4$ | $Li_{2.2}B_{0.8}C_{0.2}O_3$ | 42.5 | 42.5 | 15 | 750 | 96 | $3.2 \times 10^{-5}$ |
| Example 20 | $(Li_{6.4}Ga_{0.05}Al_{0.15})La_3Zr_2O_{12}$ | $Li_{3.4}(V_{0.6}Si_{0.4})O_4$ | $Li_3BO_3$ | 47.5 | 47.5 | 5 | 750 | 98 | $1.0 \times 10^{-4}$ |
| Example 21 | $(Li_{6.4}Ga_{0.05}Al_{0.15})La_3Zr_2O_{12}$ | $Li_{3.4}(V_{0.6}Si_{0.4})O_4$ | $Li_3BO_3$ | 42.5 | 42.5 | 15 | 750 | 97 | $5.3 \times 10^{-5}$ |
| Example 22 | $(Li_{6.4}Ga_{0.05}Al_{0.15})La_3Zr_2O_{12}$ | $Li_{3.2}(V_{0.8}Ge_{0.2})O_4$ | $Li_3BO_3$ | 42.5 | 42.5 | 15 | 750 | 95 | $3.4 \times 10^{-5}$ |
| Example 23 | $(Li_{6.4}Ga_{0.05}Al_{0.15})La_3Zr_2O_{12}$ | $Li_{3.5}(Ge_{0.5}P_{0.5})O_4$ | $Li_3BO_3$ | 42.5 | 42.5 | 15 | 750 | 93 | $3.7 \times 10^{-5}$ |
| Example 24 | $(Li_{6.4}Ga_{0.05}Al_{0.15})La_3Zr_2O_{12}$ | $Li_{3.5}(P_{0.5}Si_{0.5})O_4$ | $Li_3BO_3$ | 47.5 | 47.5 | 5 | 750 | 90 | $1.1 \times 10^{-5}$ |
| Example 25 | $(Li_{6.4}Ga_{0.05}Al_{0.15})La_3Zr_2O_{12}$ | $(Li_{3.3}Al_{0.03})(V_{0.6}Si_{0.4})O_4$ | $Li_3BO_3$ | 42.5 | 42.5 | 15 | 750 | 94 | $2.8 \times 10^{-5}$ |

The results of Examples 11 to 16 showed that even when garnet-type lithium ion conductive materials having various The solid electrolyte according to the present invention includes a lithium ion conductive material having a garnet-type structure, a lithium ion conductive material having a LISICON-type structure, and a compound containing Li and B. Thus, the solid electrolyte according to the present invention has a high ionic conductivity even when fired at low temperatures. Although the reason for this is not known exactly, it is thought that this is because, since the lithium ion conductive material having a LISICON-type structure has high wettability with both the lithium ion conductive material having a garnet-type structure and the compound containing Li and B, liquid-phase sintering is promoted, so that densification is promoted. Since a solid phase reaction is unlikely to occur between the lithium ion conductive material having a LISICON-type structure and the lithium ion conductive material having a garnet-type structure, one factor for achievement of a high ionic conductivity is considered to be the fact that it is difficult to form a heterogeneous phase which lowers the ionic conductivity.

The lithium ion conductive material having a LISICON-type structure is preferably represented by a composition formula $(Li_{[3-ax+(5-b)]}A_x)MO_4$ (A is at least one element selected from the group consisting of Mg, Al, Ga and Zn, M is at least one element selected from the group consisting of Zn, Al, Ga, Si, Ge, Ti, P and V, $0 \leq x \leq 1.0$, a is an average valence of A, and b is an average valence of M).

The lithium ion conductive material having a garnet-type structure is preferably represented by a composition formula $(Li_{[7-ax-(b-4)y]}A_x)La_3Zr_{(2-y)}B_yO_{12}$ (A is at least one element selected from the group consisting of Ga, Al, Mg, Zn and Sc, B is at least one element selected from the group consisting of Nb, Ta, W, Te, Mo and Bi, $0 \leq x \leq 0.5$, $0 \leq y \leq 2.0$, a is an average valence of A, and b is an average valence of B).

The compound containing Li and B is preferably an oxide containing Li and B.

In the compound containing Li and B, the molar ratio of Li to B (Li/B) is preferably 2.0 or more. In this case, the ionic conductivity of the solid electrolyte can be increased.

When the volume ratio of the lithium ion conductive material having a garnet-type structure is X, the volume ratio of the lithium ion conductive material having a LISICON-type structure is Y, and a volume ratio of the oxide containing Li and B is Z, preferably, $10\% \leq X \leq 89.5\%$, $10\% \leq Y \leq 89.5\%$, $0.5\% \leq Z \leq 30\%$, and $X+Y+Z \leq 100\%$ are satisfied.

When the volume ratio of the lithium ion conductive material having a garnet-type structure is X, the volume ratio of the lithium ion conductive material having a LISICON-type structure is Y, and the volume ratio of the oxide containing Li and B is Z, preferably, $37\% \leq X \leq 70\%$, $20\% \leq Y \leq 60\%$, $3.0\% \leq Z \leq 20\%$, and $80\% \leq X+Y+Z \leq 100\%$ are satisfied.

The all solid state battery according to the present invention includes a solid electrolyte layer including the solid electrolyte according to the present invention.

DESCRIPTION OF REFERENCE SYMBOLS

1: All solid state battery
11: Positive electrode
12: Negative electrode
13: Solid electrolyte layer

The invention claimed is:

1. A solid electrolyte comprising:
   a first lithium ion conductive material having a garnet-type structure;
   a second lithium ion conductive material having a LISICON-type structure, wherein the second lithium ion conductive material having the LISICON-type structure excludes $Li_4SiO_4$; and
   an oxide containing Li and B,
   wherein, when a volume ratio of the lithium ion conductive material having the garnet-type structure is X, a volume ratio of the lithium ion conductive material having the LISICON-type structure is Y, and a volume ratio of the compound containing Li and B is Z, $10\% \leq X \leq 89.5\%$, $10\% \leq Y \leq 89.5\%$, $0.5\% \leq Z \leq 30\%$, and $X+Y+Z \leq 100\%$.

2. The solid electrolyte according to claim 1, wherein $37\% \leq X \leq 70\%$, $20\% \leq Y \leq 60\%$, $3.0\% \leq Z \leq 20\%$, and $80\% \leq X+Y+Z \leq 100\%$.

3. The solid electrolyte according to claim 2, wherein the lithium ion conductive material having the LISICON-type structure is represented by $(Li_{[3-ax+(5-b)]}A_x)MO_4$, wherein A is at least one element selected from the group consisting of Mg, Al, Ga and Zn, M is at least one element selected from the group consisting of Zn, Al, Ga, Si, Ge, Ti, P and V, $0 \leq x \leq 1.0$, a is an average valence of A, and b is an average valence of M.

4. The solid electrolyte according to claim 3, wherein the lithium ion conductive material having the garnet-type structure is represented by $(Li_{[7-ax-(b-4)y]}A_x)La_3Zr_{(2-y)}\beta_yO_{12}$, wherein A is at least one element selected from the group consisting of Ga, Al, Mg, Zn and Sc, β is at least one element selected from the group consisting of Nb, Ta, W, Te, Mo and Bi, $0 \leq x \leq 0.5$, $0 \leq y \leq 2.0$, a is an average valence of A, and b is an average valence of β.

5. The solid electrolyte according to claim 1, wherein the lithium ion conductive material having the LISICON-type structure is represented by $(Li_{[3-ax+(5-b)]}A_x)MO_4$, wherein A is at least one element selected from the group consisting of Mg, Al, Ga and Zn, M is at least one element selected from the group consisting of Zn, Al, Ga, Si, Ge, Ti, P and V, $0 \leq x \leq 1.0$, a is an average valence of A, and b is an average valence of M.

6. The solid electrolyte according to claim 5, wherein the lithium ion conductive material having the garnet-type structure is represented by $(Li_{[7-ax-(b-4)y]}A_x)La_3Zr_{(2-y)}\beta_yO_{12}$, wherein A is at least one element selected from the group consisting of Ga, Al, Mg, Zn and Sc, β is at least one element selected from the group consisting of Nb, Ta, W, Te, Mo and Bi, $0 \leq x \leq 0.5$, $0 \leq y \leq 2.0$, a is an average valence of A, and b is an average valence of β.

7. The solid electrolyte according to claim 1, wherein the lithium ion conductive material having the garnet-type structure is represented by $(Li_{[7-ax-(b-4)y]}A_x)La_3Zr_{(2-y)}\beta_yO_{12}$, wherein A is at least one element selected from the group consisting of Ga, Al, Mg, Zn and Sc, β is at least one element selected from the group consisting of Nb, Ta, W, Te, Mo and Bi, $0 \leq x \leq 0.5$, $0 \leq y \leq 2.0$, a is an average valence of A, and b is an average valence of β.

8. The solid electrolyte according to claim 1, wherein a molar ratio of Li to B is 2.0 to 6.5.

9. An all solid state battery comprising:
a positive electrode;
a negative electrode; and
a solid electrolyte layer between the positive electrode and the negative electrode, the solid electrolyte layer including the solid electrolyte according to claim 1.

* * * * *